United States Patent
MacKey et al.

(10) Patent No.: US 8,671,315 B2
(45) Date of Patent: Mar. 11, 2014

(54) PROGNOSTIC ANALYSIS SYSTEM AND METHODS OF OPERATION

(75) Inventors: Ryan M. E. MacKey, Pasadena, CA (US); Robert Sneddon, Alexandria, VA (US)

(73) Assignee: California Institute of Technology, Pasadena, CA (US)

( * ) Notice: Subject to any disclaimer, the term of this patent is extended or adjusted under 35 U.S.C. 154(b) by 381 days.

(21) Appl. No.: 13/005,504

(22) Filed: Jan. 12, 2011

(65) Prior Publication Data

US 2011/0202800 A1    Aug. 18, 2011

Related U.S. Application Data

(60) Provisional application No. 61/294,778, filed on Jan. 13, 2010.

(51) Int. Cl.
*G06F 11/00*    (2006.01)

(52) U.S. Cl.
USPC .......................................... 714/47.1

(58) Field of Classification Search
USPC ..................................... 714/47.1–3
See application file for complete search history.

(56) References Cited

U.S. PATENT DOCUMENTS

| | | | | |
|---|---|---|---|---|
| 8,280,603 B2 * | 10/2012 | Cahill | .............................. | 701/70 |
| 2005/0159670 A1 | 7/2005 | Sneddon | ........................ | 600/544 |
| 2005/0159671 A1 | 7/2005 | Sneddon | ........................ | 600/544 |
| 2005/0159919 A1 | 7/2005 | Sneddon | ........................ | 702/179 |
| 2009/0132864 A1 * | 5/2009 | Garbow | .......................... | 714/47 |
| 2009/0249128 A1 * | 10/2009 | Heckman et al. | ............... | 714/47 |
| 2012/0042214 A1 * | 2/2012 | Jacobs et al. | .................. | 714/47.2 |

OTHER PUBLICATIONS

Normalization (statistics); Aug. 2, 2013; wikipedia.*
Sneddon, R. et al., "The Tsallis Entropy of Natrual Information", Physica A, vol. 386, Issue 1, pp. 101-118, Dec. 1, 2006.

* cited by examiner

*Primary Examiner* — Bryce Bonzo
(74) *Attorney, Agent, or Firm* — Steinfl & Bruno, LLP

(57) ABSTRACT

A prognostic analysis system and methods of operating the system are provided. In particular, a prognostic analysis system for the analysis of physical system health applicable to mechanical, electrical, chemical and optical systems and methods of operating the system are described herein.

30 Claims, 5 Drawing Sheets

PROGNOSTIC ANALYSIS SYSTEM AND METHODS OF OPERATION

CROSS REFERENCE TO RELATED APPLICATIONS

The present application claims priority to U.S. Provisional Application No. 61/294,778, filed on Jan. 13, 2010, which is incorporated herein by reference in its entirety.

STATEMENT OF GOVERNMENT GRANT

The invention described herein was made in the performance of work under a NASA contract, and is subject to the provisions of Public Law 96-517 (35 USC 202) in which the Contractor has elected to retain title.

FIELD

The present disclosure relates to prognostic analysis. In particular, it relates to a prognostic analysis system for the health analysis of physical systems applicable to mechanical, electrical, chemical and optical systems.

BACKGROUND

Prognostics is the process of predicting system health and system failure. The word "prognostics" is similar to "diagnostics", in that both refer to identification of a failure mode or a failed component responsible for abnormal behavior. Diagnostics typically occurs after the failure, or symptoms of failure, have already occurred (also sometimes called "fault isolation"). Prognostics differs from diagnostics at least in that prognostics determines what failure mode will likely occur in the future, or what component is starting to fail.

An aspect of prognostics is estimation of a system's life cycle and its remaining life. This allows the system user time to prepare and possibly prevent system failures. However, the prognosis of the life cycle of a system is difficult. Systems (e.g., turbofans) of the exact same build (e.g., identical brand/model), can have different life-cycles. Often, one turbofan can last more than twice as long as another turbofan. This can make life-cycle prediction difficult because the life cycle of a physical system is not just a function of time.

SUMMARY

According to a first aspect, a method of prognostic analysis is provided, the method comprising: providing a physical system; providing a plurality of sensors for the physical system for sensing a physical status of the physical system; acquiring a sensor data set from each sensor, each sensor data set comprising one or more sensor data points; configuring a sensor data point window for the plurality of sensor data sets; calculating a plurality of normalized sensor data sets from the plurality of sensor data sets based on the sensor data point window; determining a health level for the physical system as a function of the plurality of normalized sensor data sets; and providing a prognosis for the physical system based on the health level of the physical system.

According to a second aspect, a prognostic analysis system is provided, the system comprising: a sensor module, comprising a plurality of sensors, for sensing a physical status of a physical system; a data module, coupled to the sensor module, for acquiring a sensor data set from each sensor; a window module, coupled to the data module, for configuring a sensor data point window for the plurality of sensor data sets; a normalizing module, coupled to the window module, for calculating a plurality of normalized sensor data sets from the plurality of sensor data sets based on the sensor data point window; a health level module, coupled to the normalizing module, for determining a health level for the physical system based on the plurality of normalized sensor data sets; and a prognosis module, coupled to the health level module, for providing a prognosis for the physical system based on the health level of the physical system.

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure.

FIG. 5 shows that the health level trend is irreversible.

APPENDIX

Figure 1:
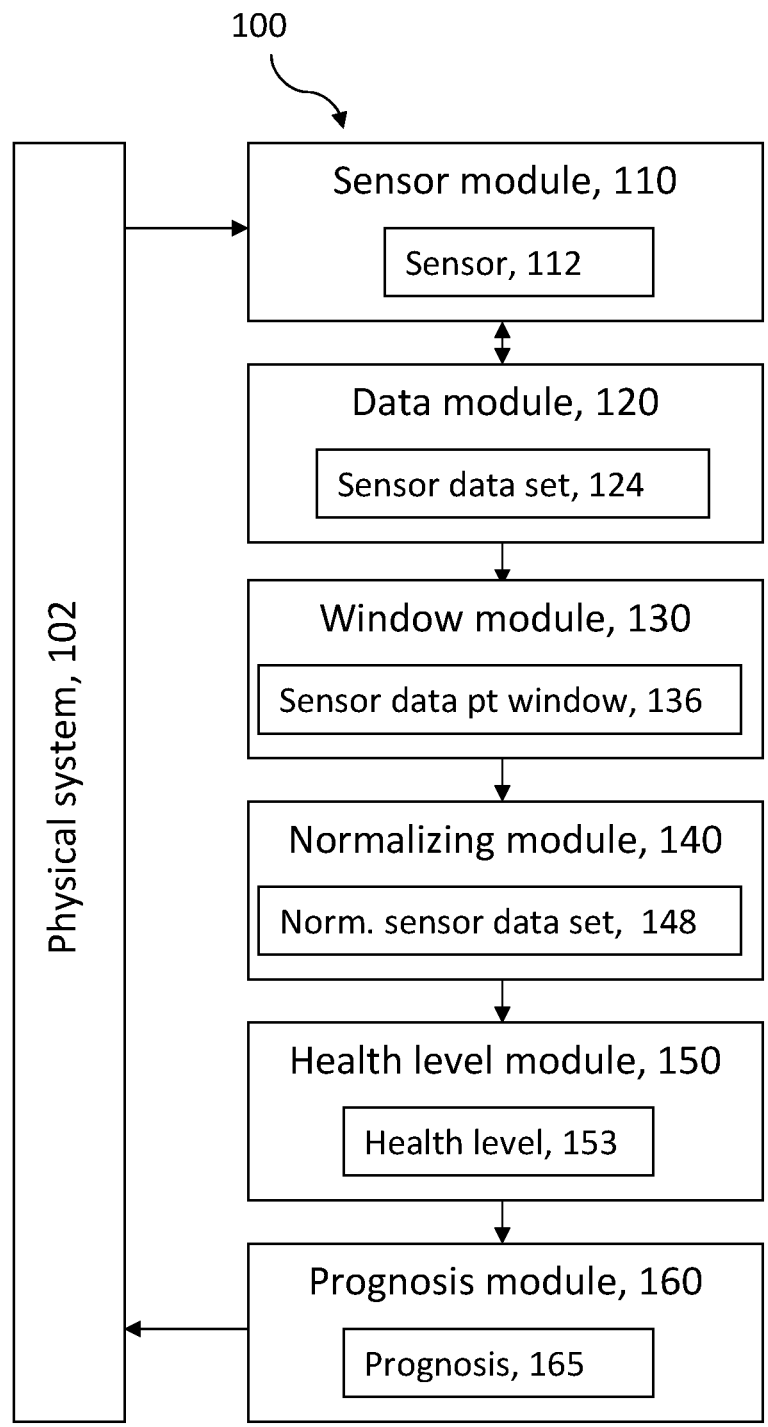
FIG. 1 shows an exemplary prognostic analysis system (100).

Appendix 1, an exemplary realization of a possible embodiment of the steps of the method according to the present disclosure, is enclosed herewith and forms integral parts of the specification of the present application.

DETAILED DESCRIPTION

Current art in the area of prognostic analysis typically require prior knowledge of failure mechanisms typically learned by destructive analysis. The analysis typically consists of 1) learning failure mechanism or mode by destructive analysis, 2) simulating the failure mechanism or mode and extracting a feature indicating the failure mechanism to gain a time map of how that feature changes before and during the failure, and 3) building a sensor to specifically trace the feature to predict the onset of the failure mechanism by comparison to the time map.

For example, for a car braking system, the failure mechanism can be metal clamp of the brake pad coming in contact with the rotor due to wear-out of the brake pad and resulting in deep scratches in the rotor and the brake to no longer function within specifications. This would be step 1) where the failure mode or mechanism is identified by examining the failure of a system (e.g. destructive analysis). Step 2) can be a wear test of brake pad to various thicknesses to determine the minimum average thickness of the brake pad present before damage is expected, and extracting the brake pad thickness as a diagnostic point as a feature to monitor. Step 3) would be to install a brake pad thickness monitor, which can be a wire that triggers a warning light when the shoe thickness reaches a pre-determined threshold thickness which is greater than the minimum average thickness where damage is expected.

In what follows, a prognostic analysis method for systems is described in accordance with various embodiments of the present disclosure. Specifically, Applicants describe a method for prognostic analysis which can result in a measure of system health with improved accuracy and repeatability. The method for prognostic analysis disclosed in the present application utilizes a statistical approach and requires no prior destructive analysis of the system. Applicants' approach applies information theory techniques to sensor data to determine when a repair, maintenance or replacement is expected. This approach is tested on a benchmark dataset based on performance sensors for aircraft turbofans, the turbofan being a type of aircraft jet engine based around a gas turbine engine. However, the approach can be applicable to any physical system with mechanical, electrical, chemical or optical components.

Traditionally sensors are typically treated as sources of physical operating information for a system (e.g. temperature, pressure). The method of the present disclosure applies information theory techniques to extract underlying information in the sets of ergodic (physical) sensor data. The information extracted is dependent on how the sensor data points vary individually in comparison to the total variance of the sensor data set. Thus, the method uses sensor data and extracts unexpected information for which they were not originally intended. The unexpected information is normalized and shown in the following as a metric of system health or health level.

Use of Information Theory

Information theory was invented by Claude Shannon. Shannon showed that the information in a formal communication system is:

$$H(x) = -\sum_i p(x_i) \ln p(x_i)$$

Here, H is the information, p is the probability and $x_i$ is a particular information event. Note that this measure is the same measure as the entropy measure of Gibbs and Boltzmann. For that reason, Shannon's information measure is often referred to as "entropy."

This entropy measure can be generalized. For example, Shannon assumed that the total entropy of a system is equal to the expected value of the parts of a system. However, this assumption of additivity need not be true. Instead an entropy measure can be sub-additive or super-additive. That possibility is quantified in an entropy measure proposed by the physicist, Constantino Tsallis:

$$H_T(x) = \frac{1}{q-1}\left(1 - \sum_i p^q(x_i)\right)$$

Here, q is a parameter. In the limit that q goes to 1, this measure becomes the standard Shannon measure.

Information theory is a theory designed to describe formal communication systems, for example, systems like a computer or Morse code which were specifically engineered to transmit information. However, many physical systems appear to contain information even though they weren't specifically engineered for that purpose. The brain appears to process information, but is not a product of human engineering. Similarly, light reflecting off of an object such as a tree contains information but was not engineered for that purpose. Even things that are engineered, such as the sensor data from a turbofan, may contain information which was unintentional to their original purpose.

Traditional information theory was not designed to examine things with unknown information signals. However, there is a way to measure the information in a single signal (Sneddon, 2007, *Physica A*, 386(1), pp. 101-118, incorporated in its entirety by reference). Sneddon showed that if information in an electrical signal is optimally encoded (in terms of energy/frequency tradeoff), then the Tsallis entropy (for q=2) of the information in the signal is:

$$H_T(X) = k\left(1 - \frac{\sum n_i \sigma_i^2}{N_T \sigma_{Total}^2}\right)$$

Here, $\sigma_i^2$ is the variance of the voltage within each information signal (defined by discontinuities and critical points in the signal), $n_i$ is the total number of data points (directly proportional to the time) in this variance, $\sigma_{Total}^2$ is the total variance of the signal voltage, and $N_T$ is the total amount of data points in the signal (also directly proportional to the total time). k is an arbitrary positive constant.

This equation holds true for a single signal. However, Applicants wish to measure the information encoded by an ensemble of signals (e.g., the data coming from turbofan sensors). The applicants hypothesize that a similar equation holds true for the information encoded in an ensemble of signals:

$$H = 1 - \frac{\sum_{Sensors} n_i \sigma_{Within}^2}{N_T \sigma_{All\,Sensors}^2}$$

This equation is similar to the earlier equation except that it sums over the variance within different sensors, and it is used to calculate the health factor in the present application.

Applicants note that the use of the information metric for system health leads to an unexpected result in comparison to the use of the information metric in the typical contexts. In the typical application context of information metric, system degradation is characterized by a decrease in the information metric. For example, as communication systems degrade, the signal-to-noise ratio declines, and correspondingly the information content of the signal decreases.

In the context of system health, however, declining system health can indicate that the information content increases rather than decreases. This is an unexpected result, but not a contradiction because Applicants are not measuring the system output, as in the communication example above, but instead measuring the information in indicators of system performance. When a physical system is in good working order, a momentary shift in sensor data is simply a "glitch", and the system returns to normal, remains linear, and does not propagate the event into another part of the physical system. In other words, when healthy, readings that cause a momentary shift in sensor data are sporadic and are essentially random noise, containing no information. This type of behavior is also know as a "deadband" of a signal where the deadband is a small range of variation around the average operating point that does not indicate any actual physical change in the system.

On the other hand, when the physical system is degraded, faulty indications become more frequent and correlated with other errant measurements since failure physics creates new mechanisms within the physical system even if no individual sensor indicates a significant shift in operating point. In other words, when the physical system begins to fail, problem indicators become predictable, and this leads to an increase in the information content of the performance sensors.

Prognostic analysis utilizing information theory disclosed in the present application does not require a detailed failure mechanism for the physical system to be known or time mapped. However, a general failure mode and effects analysis (FMEA), or failure mode, effect and criticality analysis (FMECA) of the system may be useful, where FMEA is a bottom-up, inductive analytical method which may be performed at either the functional or piece-part level. FMECA extends FMEA by including a criticality analysis, which is used to chart the probability of failure modes against the severity of their consequences. Applicants note that systems which have predominately wear-out types of failure mechanisms (also known as incipient faults), which are characterized by a gradual reduction in system performance over time, are better suited for the prognostic analysis method of the present disclosure.

It is noted that the methods and systems described in the present disclosure may be implemented in hardware, software, firmware, or combination thereof. Features described as blocks, modules, or components may be implemented together (e.g., in a logic device such as an integrated logic device) or separately (e.g., as separate connected logic devices). The software portion of the methods of the present disclosure may comprise a computer-readable medium which comprises instructions that, when executed, perform, at least in part, the described method. The computer-readable medium may comprise, for example, a random access memory (RAM) and/or a read-only memory (ROM). The instructions may be executed by a processor (e.g., a microprocessor, a microcontroller, a digital signal processor (DSP), an application specific integrated circuit (ASIC), a standard logic integrated circuit, or a field programmable logic array (PLD, FPGA etc.)).

Technical Approach

Referring to FIG. 1, shown therein is an exemplary embodiment of the prognostic analysis system (100) of the present disclosure. The prognostic analysis system (100) comprises a sensor module (110), a data module (120), a window module (130), a normalizing module (140), a health level module (150), and a prognosis module (160). The prognostic analysis system (100) is coupled to a physical system (102) and is for the analysis of the physical status of the physical system (102) to provide a prognosis (165) for the physical system (102).

The physical system (102) is coupled to the sensor module (110) which comprises at least two sensors (112) for sensing the physical status of the physical system, such as temperature, pressure and RPM measurements.

Referring still to FIG. 1, the data module (120) is coupled to the sensor module (110) and is for the acquiring sensor data sets (124) consisting of time interval-separated, quantitative data during the operational lifetime of the physical system (102). As mentioned previously in the present disclosure, the sensor data set (124) does not need to be directed at any specific feature designed to map any specific failure mechanism or mode.

In fact, the sensor data set (124) can be derived results from direct measurements by a sensor (112). For example, time to reach an operating temperature which can be derived from the operating temperature data, or power at first resonance frequency which can be derived from accelerometer vibration data. The sensor data set (124) also does not require fixed time interval between successive data points of the sensor data set (124) to be usable for the prognostic analysis system (100). However, time correlation between the data points in the sensor data set (124) from different sensors (112) for the physical system (102) is useful. For example, data point 1 from each of the sensor data sets (124) 1 through n, for n sets of sensor data (124) from n sensors (112) can be collected at or about the same time for the prognostic analysis system (100) to be effective.

In an exemplary embodiment, turbofan data is taken from the 2008 Prognostics Challenge, which provided a standard data set for prognostic algorithm evaluation compiled by the IEEE Prognostics Society. These sensor data sets (124) consist of returns from sensors (112) for 100 different turbofans as they undergo multiple operational cycles before failure. Each data record or data point is an "average" of sensor values for a given operational cycle (i.e. representative of the operating point of the turbofan rather than a record of dynamic sensor data). There are numerous sensors (112) in each record of each type, the types of sensors (112) including temperatures, pressures, and RPM measurements. Each sample thus represents the state of the turbofan during a single operational cycle, such as a single flight.

It is noted that although the physical system (102) in this embodiment is each of the turbofans, the physical system (102) can be any physical system comprising components that are mechanical, electrical, optical, chemical or combinations thereof. For example, the physical system (102) can be an engine, a brake system, a chemical production plant, etc.

The data module (120) can be implemented by a computer or a controller, which can initiate an acquisition of data from each sensor (112) of the sensor module (110) executing a sampling strategy which can be designed to capture possible wear-out mechanisms. The data module (120) can also comprise a communication component for communicating with each sensor (112) of the sensor module (110). The data module (120) can also comprise a data storage component for storing the sensor data sets (124) for subsequent analysis. In case of the provided turbofan data set, acquisition of the data from the sensors (112) is completed, but the sensor data sets (124) are stored in the data module (120).

For example, in the case of a turbofan, the data module (120) can be implemented by the flight computer, an embedded controller, and a data bus. The embedded controller for the turbofan can read the sensors (112) and communicate the sensor data sets (124) to a data bus (e.g., IEEE-1553 standard) which sends the sensor data sets (124) to a flight computer. The flight computer stores some of this data for download and analysis after the flight is over. The data module (120) may be implemented with other components for other physical systems (102).

The window module (130), coupled to the data module (130) can take the sensor data set (124) and configure a sensor data point window (136) for normalizing the time interval-separated data. Since the data from different sensors (112) look very different, the Applicants normalized the sensor data sets using a z-transform ($z=x-\mu/\sigma$) using a sensor data point window (136). Such normalization allows to focus on the variation of the actual sensor data signal instead of an actual value of the sensor data itself. In this case, the sensor data point window (136) is chosen to be 20 points wide for smoothing out the data to minimize irregular behavior of the data. However, the sensor data point window (136) can be sufficiently sized to ensure the failure trends are not masked.

The sensor data point window (136) can be determined by iterative improvement for the physical system (102). As an example guideline, a sensor data window of greater than 10 can be chosen to obtain a smooth average. The window may be made larger if the health level (153) computed appears too random and requires smoothing. An ideal sensor data point window (136) is less than twice as long (in real time) as the anticipated lifetime of the system (e.g., for a turbofan with an mean time between failure of 80 hours, and an average flight duration of 3 hours, data sampled only once per flight, a maximum for the sensor data point window (136) may be 2×80/3=52 samples).

In the case of frequently sampled data, such as those usually available on board a vehicle or in contact with a physical system, there is no practical limitation on the maximum window size. For example, using the previous case with data available at a rate of 1 Hz gives a recommended maximum size of 2×80×60×60=over half a million samples, which greatly exceeds the optimal window size anticipated for any application.

Referring again to FIG. 1, the normalizing module (140) can be used to normalize the sensor data utilizing the sensor data point window (136) to calculated normalized sensor data sets (148). Applicants computed the mean and standard deviation of a sensor data point window (136) of 20 point wide for each of 6 sensors (112) and then subtracted this mean and divided by the standard deviation for all the data of each of the 100 turbofans.

The health level module (150), coupled to the normalizing module (140) can utilize the normalized sensor data sets (148) to determine a health level (153) for the physical system (102) by applying the entropy (H) equation shown in the section on "use of information theory." Since this equation represents information/entropy, Applicants subtracted the value from 1 to create the health level (153). The health level (153) is defined at 1 for a device in new condition and decreasing to zero as the device wears out completely.

The prognosis module (160), coupled to the health level module (150) can utilize the health level (153) and trends of the health level (153) to predict failure and end-of-life for the physical system (102). The prognosis module (160) can also indicate a need for repair. In the example case as described for the turbofan, the normalizing module (140), the health level module (150), and the prognosis module (160) can be implemented with a flight computer for in-flight analysis, or with a standalone personal computer for a post-flight analysis.

Applicants note four specific behaviors for the health level which are useful in prognostic analysis for the system: 1) The health level shows an overall decrease in time, 2) the health level shows the machine's life-cycle, 3) the health level is irreversible, 4) the health level increases after a repair.

Figure 2:
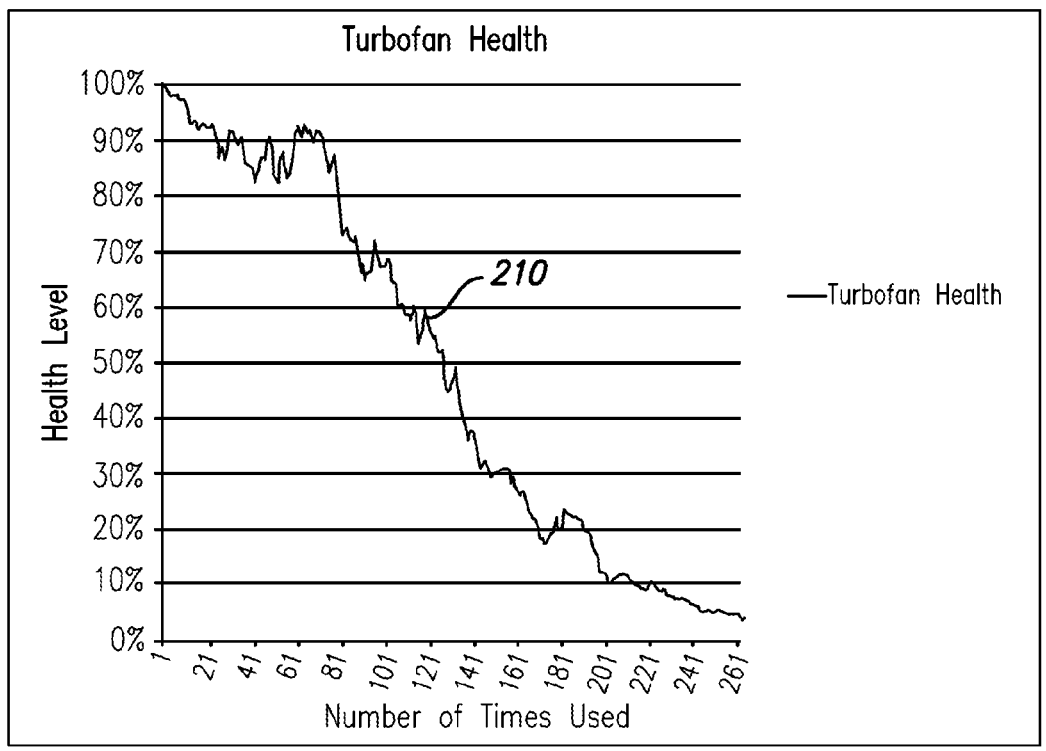
FIG. 2 shows the health level trend of a system as determined by an exemplary prognostic analysis system.

When the prognostic analysis method is applied to a set of test data from many turbofans, the health level demonstrates a gradual decrease in performance compared against successive uses of the same systems. A typical graph of the health level of a turbofan, derived from its performance data, is shown in FIG. 2.

For this turbofan, one sample of performance data is provided for each usage run, and the point at which the turbofan failed or was taken out of service is known (e.g., the end of each graph). Wear in the system occurs at an unknown rate, and the input data is of varying length. Applicants note there appears to be a systematic decrease in health level trend (210) with time for this turbofan.

Figure 3:
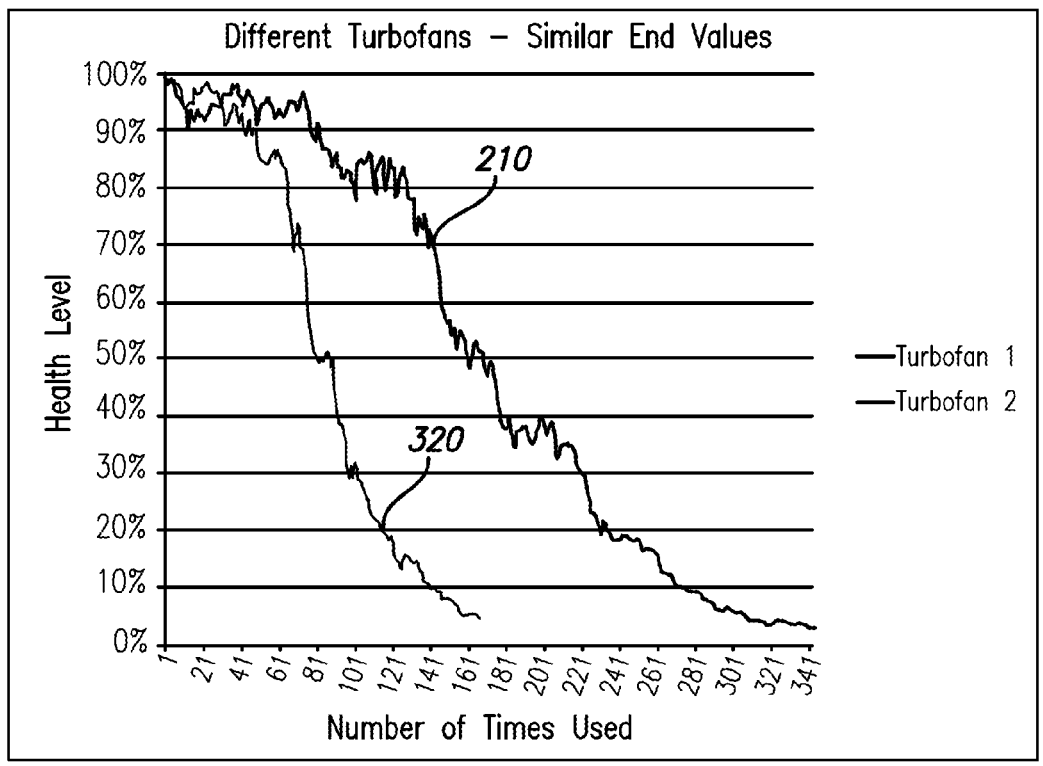
FIG. 3 shows the health level trend of two systems as determined by an exemplary prognostic analysis system, showing similar end-of-life health levels.

Time is not the only factor which can impact the health level. FIG. 3 shows that different turbofans can degrade at dramatically different rates. Specifically, FIG. 3 shows two different turbofans, the health level of a first turbofan (210), and the health level trend of a second turbo fan (320) which lasted half as long as the first turbofan, although both have beginning and end-of-life health levels which are almost exactly the same as the other at the same state.

Note that both turbofans have ending health level of about 5% even though one turbofan has twice the longevity of the other. Each turbofan is taken out of service at a health level of about 5% for repair, maintenance or replacement. The minimum useful health level of 5% where repair, maintenance, or replacement is indicated, can also be seen in the laboratory generated ideal sensor data in the analysis of the present disclosure.

It is further noted that the systems have not yet failed at the 5% health level. The threshold health level of 5% further indicates a saturation of the method such that there is no longer any effective randomness left in the sensor data variations. Once the 5% health level threshold is reached, two consequences can be expected: 1) The physical system operates with different failure physics than when its health level is above 5%, or 2) Further use of the prognostic analysis can no longer reveal new information. Therefore the physical system is indicated or predicted to be taken out of service for repair, maintenance, or replacement at or before the 5% health level is reached.

In the laboratory generated ideal sensor data case, Applicants supplied an algorithm with ten signals, and 1,000 samples generated artificially for each case. In the first case, shown as (410) in FIG. 4, all signals are totally random, following a uniform distribution (not a Gaussian) within a deadband from 0 to 1. This represents the "worst case" of a noisy signal where there is no trend. In the second case, shown as (420), these signals are overlaid with a linear trend in all of the signals, shifting the average by a rate of 1 every 200 samples. The third case shown as (430) introduces a sharper trend of 1 every 50 samples.

Figure 4:
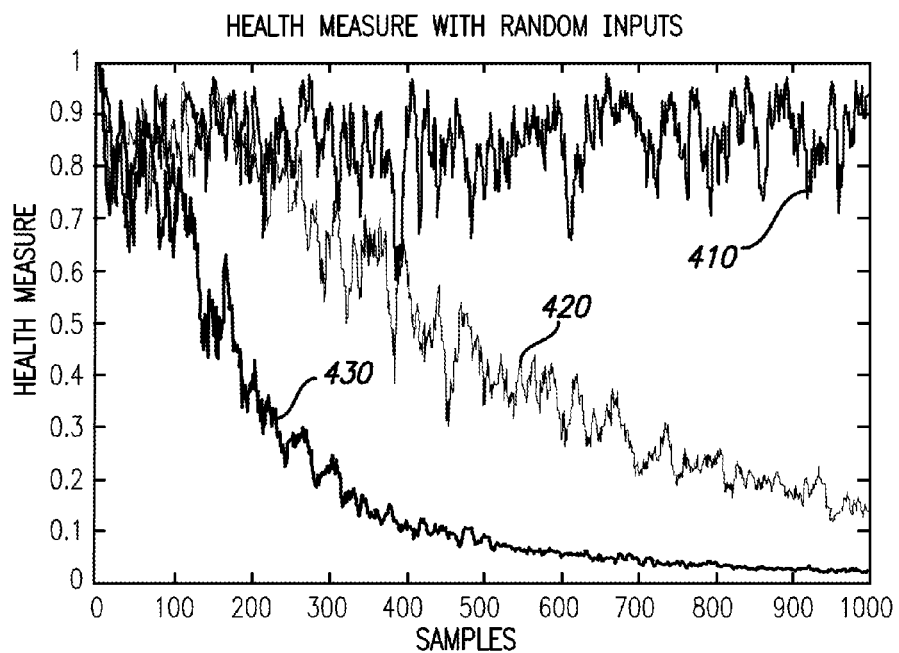
FIG. 4 shows the health level trend of three simulated systems indicating health level trends for purely random sensor data and random sensor data with known decrease in performance with time trends.

From FIG. 4, Applicants show that in the first case (410) where there is no trend, the health level remains consistent (if noisy) and high, in this case never falling below approximately 0.6. In the case of a real system where random noise is Gaussian, or with any kind of signal averaging available—which is usually the case for performance estimates—the health level will be even better behaved.

In contrast, the signals with overlaid trends (420, 430) clearly and steadily trend towards zero. The second case (420) is clearly distinct from the first case (410) after approximately 200 samples, corresponding to the time where the trend is significant compared to the noise band. Similarly, the third case (430) is distinct after less than 100 samples, in keeping with its greater slope. From this behavior, Applicants can also estimate that the minimum usable health level is approximately 0.05. Any value at or below this figure can be understood to indicate a system that is well outside of its normal operating range and at risk of imminent failure.

Figure 5:
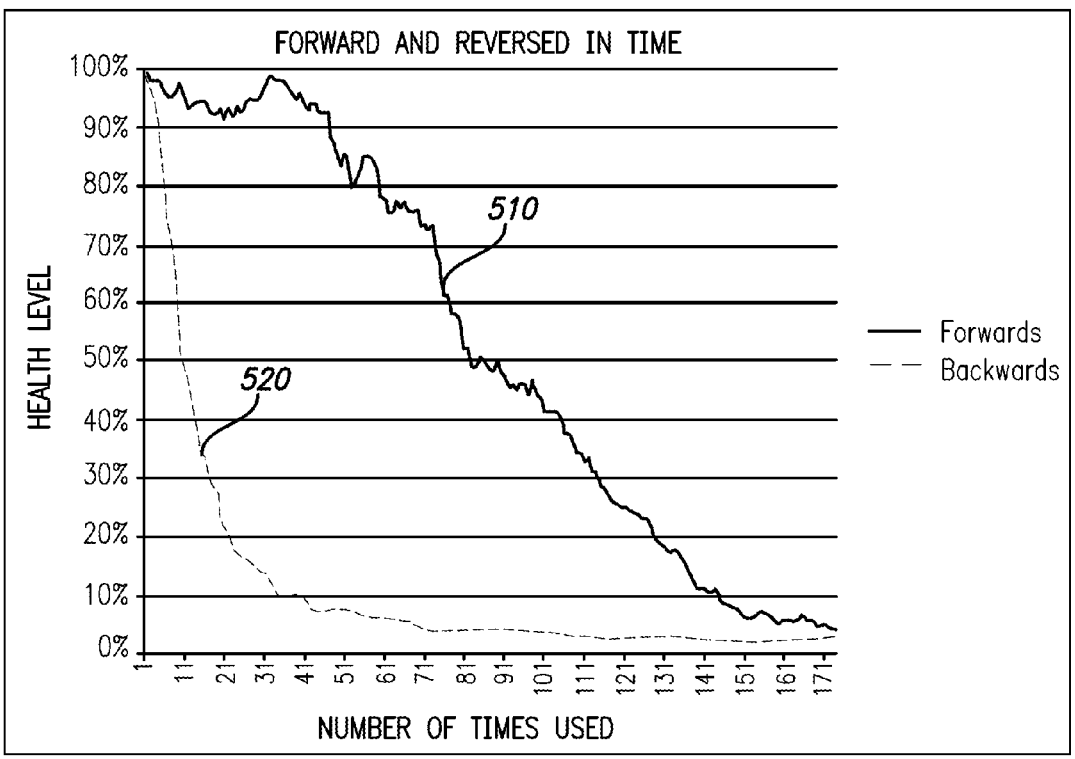
FIG. 5 shows the health level trend of a system wherein the sensor data is analyzed with time moving forward and reverse.

Again by way of artificially testing the analysis, the health level can be demonstrated to be irreversible utilizing the real data. FIG. 5 shows the health level trend of a turbofan calculated with its sensor data sets (124 of FIG. 1) in time interval order (shown as 510) and with its data ordered in reverse with time (shown as 520). FIG. 5 indicates that when the sensor data set (124) is reversed in time the resulting health level trend (520) shows a much steeper drop with time and does not resemble the health level trend (510) plotted in correct time order.

The health level trend of the time-reversed turbofan as shown (520) is completely different from that of the original turbofan's health level trend (510). Instead of slowly losing health, it almost immediately goes to nearly zero. This feature of the health measure is due to its consideration of both system average and variance—when reversed in time, the system departs from its average and increases its variance quickly, stabilizing on new values, and does not recover.

Figure 6:
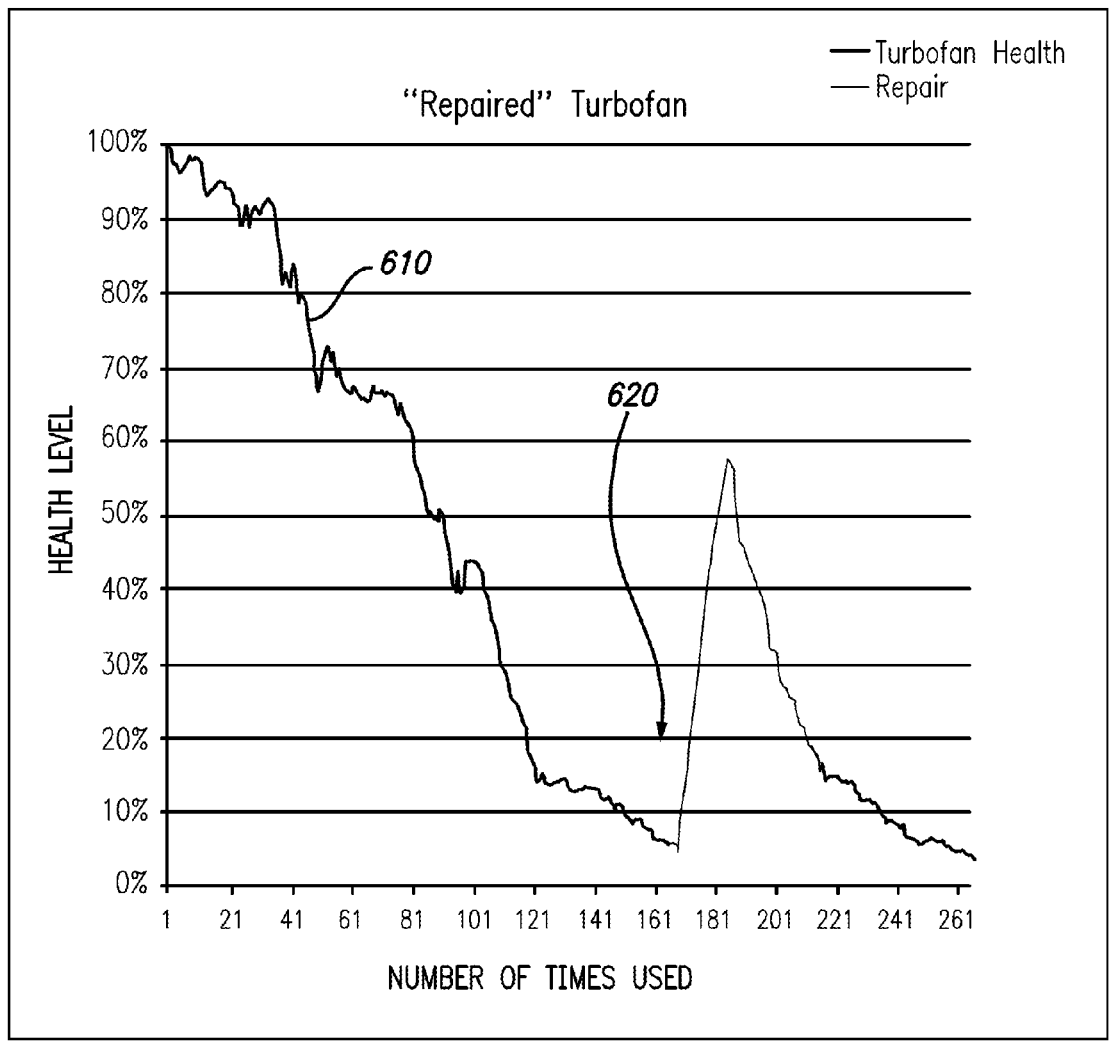
FIG. 6 shows the health level trend of a physical system with simulated repair.

FIG. 6 further illustrates the value of this health measure by demonstrating the health level (610) for a turbofan showing an increase accompanying a simulated repair (see repair point 620). The repair scenario is simulated since the turbofan data used in this study were presented as a single-blind dataset, and were not accompanied by a description of the actual events during the life-cycle of each turbofan. Applicants simulated the repair by taking the sensor data of a turbo fan which was almost at the end of its life-cycle and including the sensor data of a different turbofan. This second turbofan sensor data was included at the same number of usages; however, this turbofan was used several more times before it stopped working. The Applicants then computed the health level of this "repaired" turbofan. The results are given in FIG. 6 where the health level (610) shows a marked increase following the repair (620).

In another embodiment of the present disclosure and referring the FIG. 1, the prognosis module (160) can indicate a need for repair, resulting in physical repairs to the physical system (102). The repair (610) can result in an increase in the health level (153) of the physical system (102) (shown in FIG. 6). Thus, the acquisition of the sensor data sets (124) by the prognostic analysis system (100) results in the transformation of the sensor data set (124) into a prognosis (165) for the physical system (102) and repairs to the physical system (102) which leads to an increase of the health level of the system and an accompanying potentially longer operation time for the physical system (102) in the physical world.

In yet another embodiment of the present disclosure, the prognostic analysis system (100) may be for a small subsystem of a complex machine, such as an engine of an airplane, with 2 to 100 sensors. In an example of the present disclosure, about 10 sensors (112) are in the sensor module (110). The data module (120) can collect data from each of the 10 sensors (112) at about the same time with a sampling plan which can be once per flight in order to capture data from every operation. A personal computer, such as one with an Intel PENTIUM processor running a program such as MAT-LAB, can be used to collect and store the data, for example, in a spreadsheet format such as CSV (comma-separated value), and the prognosis (165) can be used to determine when repair or replacement of the engine is expected.

Figure 7:
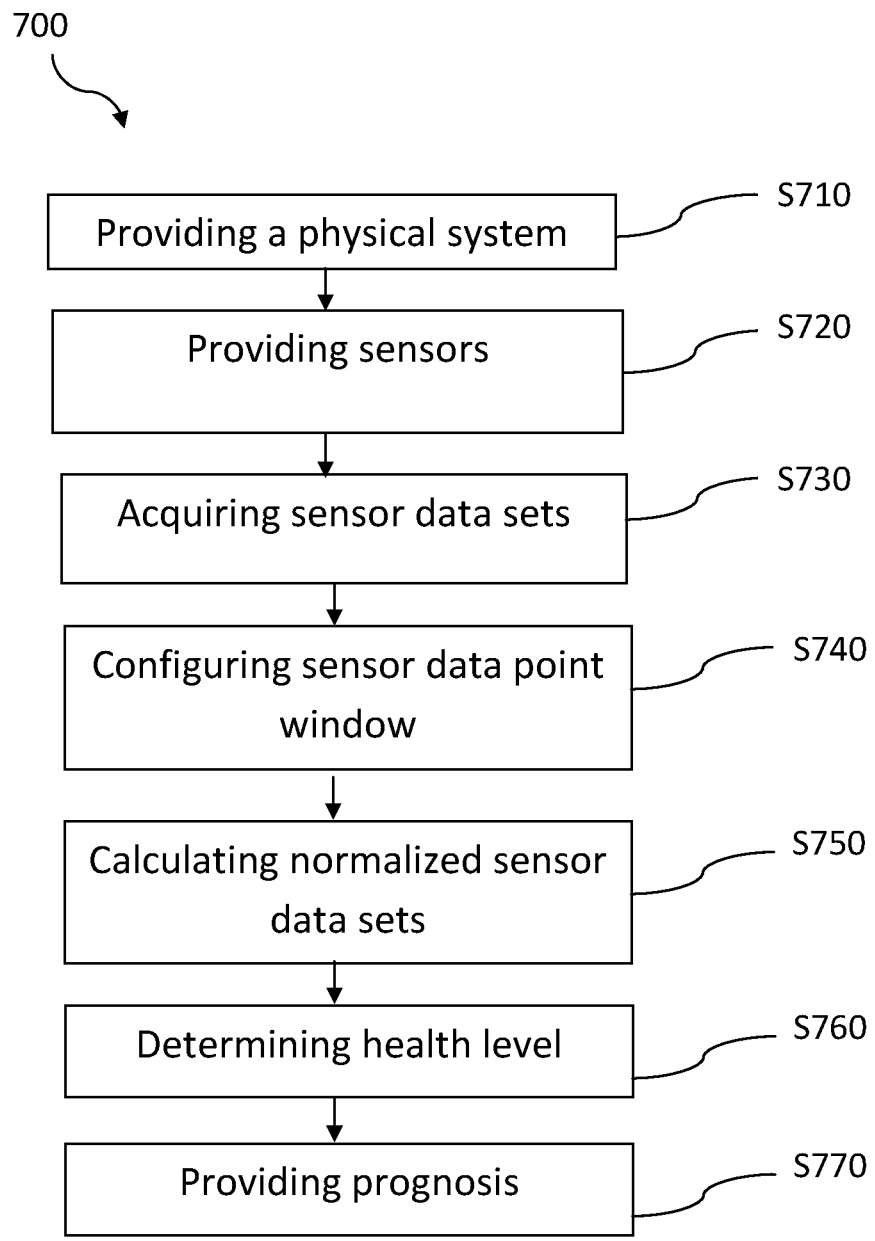
FIG. 7 shows a flow chart of an exemplary method of prognostic analysis.

Referring now to FIG. 7 therein is shown a flow chart of a method (700) of operation of a prognostic analysis system (100 of FIG. 1) in a further embodiment of the present disclosure. The method (700) includes: providing a physical system (S710); providing sensors (S720); acquiring sensor data sets (S730); configuring sensor data point window (S740); calculating normalized sensor data sets (S750); determining health level (S760); and providing prognosis (S770).

Thus, the prognostic analysis system (100) and method (700) of operating the system (100) appears to provide a capability for the early detection of anomalies as well as the prediction of how much life is left in the physical system as demonstrated by the exemplary systems of turbofans. The prognostic analysis method (100) does not necessarily require detail pre-knowledge of specific wear-out mechanism. However general failure modes and effects analysis or failure mode, effects, and criticality analysis may be needed to identify that the expected failure modes are most likely of the wear-out types which are characterized by a gradual reduction in performance over time, rather than the brittle-break types which are characterized by sudden an catastrophic failure. The prognostic analysis system (100) and methods (700) of operating the system (100) can be applicable to many mechanical, chemical, optical, and electrical systems.

The examples set forth above are provided to give those of ordinary skill in the art a complete disclosure and description of how to make and use the embodiments of the present disclosure, and are not intended to limit the scope of what the inventors regard as their disclosure. Modifications of the above-described modes for carrying out the disclosure may be used by persons of skill in the art, and are intended to be within the scope of the following claims. All patents and publications mentioned in the specification may be indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. For example, the person skilled in the art will understand that the number steps or components shown is only indicative and that the method can occur in more or fewer steps and that the system may contain more or less components according to the various embodiments. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

A number of embodiments of the disclosure have been described. Nevertheless, it will be understood that various modifications may be made without departing from the spirit and scope of the present disclosure. Accordingly, other embodiments are within the scope of the following claims.

APPENDIX 1

```
% ITHEALTH Information-theory based estimator of system health
%
% Usage: [healthout] = ithealth(inputmatrix, windowsize, sigavgs, sigstds)
%
% ITHEALTH is derived from the research code INFOHEALTH developed by
% Robert Sneddon, September 2009. Modifications made by Ryan Mackey.
%
% ITHEALTH provides an estimate of system health from performance data,
% updated with each new set of information. This information is assumed
% to be in rectangular form, i.e. N sensors by M samples, but may be
```

APPENDIX 1-continued

```
% irregular. Typically, this information is provided as an average of
% performance sensors that is updated only once per cycle, i.e. an average
% snapshot of performance for a single flight or a single operation of
% the system. This signal is assumed to have no dynamic information.
% Instead, trends in the value of the performance data from one run to the
% next may provide an indication of system health.
%
% The ITHEALTH algorithm estimates system health from local signal
% variances. If these variances are random and uncorrelated, then the
% information content of the signals will be very low. Conversely, a high
% information content indicates a pattern to the signal variances, i.e. an
% emerging trend. Since systems rarely trend towards getting healthier,
% this is in general evidence of a deteriorating condition. This can also
% be seen by a consideration of system stability -- when a system is
% healthy, it has a "dead band" of stability, where minor deviations in
% any particular signal do not affect the rest of the system. But as it
% ages and wears, its stability is compromised, or excursions finally pass
% beyond the "dead band," and in so doing create a global response, which
% we detect as information in the signals.
%
% ITHEALTH accepts any number of signals. In testing this number is
% usually in the high single to low double digits. If the signal count is
% very low (say less than four) it will become more difficult to estimate
% the information content.
%
% The only parameter is the window size. This window defines how local
% our local variance is. The default value is 10, i.e. we will examine
% trends over the last 10 cycles compared to the entire history of
% operation. For small numbers of signals this value may be increased,
% which will introduce additional lag in the estimate, but may provide
% better accuracy.
%
% ITHEALTH also has better performance if the signal averages and standard
% deviations during normal operation are known ahead of time (for
% instance, the standard operating point and noise characteristics of the
% sensors). These parameters are generally available from specifications
% or can be computed from nominal data. If available, they can be
% supplied to ITHEALTH as vectors, each of length equal to the number of
% sensors. If not available, ITHEALTH will automatically estimate these
% values from the first few measurements supplied, i.e. the first
% windowful of data. It is not recommended to supply only the averages
% without also providing the standard deviations. However, the algorithm
% is not particularly sensitive to these parameters.
%
% ITHEALTH simulates "real time" operation by reading in the input
% file as a single matrix, then sending the contents line by line to the
% algorithm itself. For an embedded application, remove this shell and
% apply live data to the algorithm directly, while making provisions to
% retain past data for purposes of windowing.
%
% ITHEALTH (C) 2009, Jet Propulsion Laboratory
% Original Version 6 October 2009
% This Version 1.0, 6 October 2009
% Contact: Ryan Mackey, Ryan.M.Mackey@jpl.nasa.gov, (818) 354 9659
% ----------
function [healthout] = ithealth(inmat, windowsize, sigavgs, sigstds)
% Check for input parameters
if exist('windowsize') ~= 1      % If no windowsize provided,
    windowsize = 10;         % Set default window size to 10
end
if exist('sigavgs') ~= 1     % If signal averages not provided, estimate from
    sigavgs = mean(inmat(:,1:windowsize),2);       % first windowful of samples
end
if exist('sigstds') ~= 1     % If signal standard deviations not provided,
    sigstds = std(inmat(:,1:windowsize),0,2);        % estimate these as well
end
% Initialize variables
[numsigs, numsamp] = size(inmat);
datawin = zeros(numsigs, windowsize);     % Create buffer for windowed data
count = 0;              % Initialize count of how many samples we've read
% Begin main loop
for i = 1 : numsamp
   % Update data buffer
   for j = 1 : windowsize–1
      datawin(:,j) = datawin(:,j+1); % Shift window buffer by 1
   end
   % Update window with current data
   currentdata = inmat(:,i);
   datawin(:,windowsize) = (currentdata – sigavgs) ./ sigstds;
   % We normalize the incoming data by the average and std devs
```

APPENDIX 1-continued

```
    count = count + 1;           % Keep track of how many samples so far
    % Calculate sum of individual variances
    sumvar = 0;
    for k = 1 : numsigs
        sumvar = sumvar + var(datawin(k,:));
    end
    % Calculate overall variance for current window
    tempwin = reshape(datawin,  1, windowsize * numsigs);   % Put whole window
into a single vector
    allvar = var(tempwin);                  % and then compute the variance of this
whole vector
    % Now compute and store overall information measure
    healthout(i) = (windowsize – 1) * sumvar / ( (numsigs * windowsize – 1) *
allvar);
    % However, if window is not yet full, substitute a value of 1 since
    % computation is invalid
    if count < windowsize
        healthout(i) = 1;
    end
end   % End main loop
```

The invention claimed is:

1. A method of prognostic analysis comprising:
providing a physical system;
providing a plurality of sensors for the physical system for sensing a physical status of the physical system;
acquiring a sensor data set from each sensor, each sensor data set comprising one or more sensor data points;
configuring a sensor data point window for the plurality of sensor data sets, the sensor data point window being a time window;
calculating a plurality of normalized sensor data sets from the plurality of sensor data sets based on the sensor data point window;
determining a health level for the physical system as a function of the plurality of normalized sensor data sets; and
providing a prognosis for the physical system based on the health level of the physical system,
wherein said health level is an indicator of a performance of the physical system, and
the indicator measuring how the normalized sensor data of the plurality of sensor data sets vary individually in comparison to a total variance of the plurality of sensor data sets.

2. The method according to claim 1, wherein the physical system comprises components selected from the group consisting of mechanical component, electrical component, optical component, chemical component and combinations thereof.

3. The method according to claim 1, wherein the physical system comprises components which exhibit wear-out behavior, and wherein the sensor data sets provide indication of the wear-out behavior.

4. The method according to claim 1, wherein the plurality of sensor data sets comprise time interval separated, quantitative data.

5. The method according to claim 4, wherein the time interval between each data point and the next data point for each sensor data set is fixed or variable.

6. The method according to claim 4, wherein the health level for the system decreases with time.

7. The method according to claim 1, wherein each data point from one sensor data set is acquired at the same time or near the same time as a corresponding data point from another sensor data set.

8. The method according to claim 1, wherein the number of sensors is at least 2.

9. The method according to claim 1, wherein the configuring the sensor data point window further comprises configuring a size for the sensor data point window to be large enough such that irregular behavior is minimized and small enough such that failure trends are captured.

10. The method according to claim 1, further comprising conducting a repair to the physical system in accordance with the prognosis, thus providing an increase in the health level of the physical system.

11. The method according to claim 1, wherein the providing the prognosis further comprises predicting an expected repair, maintenance, or replacement of the physical system when the health level of the system reaches about 5%.

12. The method according to claim 11, wherein destructive analysis of the physical system is not required to be performed.

13. A system comprising a computer readable medium configured with instructions that when executed perform the method according to claim 1.

14. The method of claim 1, wherein the sensor data point window is configured to normalize sensor data sets so that unexpected information or momentary shift in sensor data do not propagate and are thus ignored.

15. The method of claim 1, wherein said health level is calculated according to the following equation:

$$H = 1 - \frac{\sum_{Sensors} n_i \sigma^2_{Within}}{N_T \sigma^2_{All\ Sensors}}$$

wherein $\sigma^2$ denotes variance, $\sigma^2$ denotes variance within different sensors across a sensor data point window, $n_i$, is the total number of data points in the sensor data point window, $N_T$ is the total amount of data points.

16. The method of claim 1, wherein the sensor data sets are not directed to any specific feature designed to map any specific failure mechanism or mode of said physical system.

17. The method of claim 1, wherein each data point is an average of sensor acquired data for a given operational cycle of the physical system.

18. A prognostic analysis system comprising:
a first processor configured to sense a physical status of a physical system and comprises a plurality of sensors;

a second processor configured to acquire a sensor data set from each sensor of the plurality of sensors, the second processor being coupled to the first processor;

a third processor configured to configure a sensor data point window for a plurality of sensor data sets, the third processor being coupled to the second processor and the sensor data point window being a time window;

a fourth processor configured to calculate a plurality of normalized sensor data sets from the plurality of sensor data sets based on the sensor data point window, the fourth processor being coupled to the third processor;

a fifth processor configured to determine a health level of the physical system based on the plurality of normalized sensor data sets, the fifth processor being coupled to the fourth processor; and a sixth processor configured to provide a prognosis for the physical system based on the health level of the physical system, the sixth processor being coupled to the fifth processor, wherein said fifth processor is configured to determine the health level of the physical system as an indicator of a performance of the physical system, the indicator measuring how the normalized sensor data points of the plurality of sensor data sets vary individually in comparison to the total variance of the plurality of sensor data sets.

19. The system according to claim 18, wherein the first processor comprises components selected from a group consisting of mechanical components, electrical components, optical components, chemical components and combinations thereof.

20. The system according to claim 18, wherein:
the first processor comprises components which exhibit a wear-out behavior; and
the first processor provides indication of the wear-out behavior.

21. The system according to claim 18, wherein the second processor is for acquiring a sensor data set comprising time interval separated data and quantitative data from each sensor of the plurality of sensors.

22. The system according to claim 21, wherein the second processor is for acquiring a sensor data set comprising time interval separated data and, quantitative data having fixed or variable intervals between each data point and a next data point.

23. The system according to claim 18, wherein the health level decreases with time.

24. The system according to claim 18, wherein the second processor acquires each data point from one sensor data set at a same time or near the same time as a corresponding data point from another sensor data set.

25. The system according to claim 18, wherein the first processor comprises at least 2 sensors.

26. The system according to claim 18, wherein the third processor is configured to configure a size of the sensor data point window to be large enough such that irregular behavior is minimized and small enough such that failure trends are captured.

27. The system according to claim 18, wherein:
the sixth processor is configured to further indicate a repair of the physical system in accordance with the prognosis; and
the fifth processor is configured to further determine an increase in the health level of the physical system due to the repair.

28. The system according to claim 18, wherein the sixth processor is configured to further predict an expected repair, maintenance, or replacement of the physical system.

29. The system according to claim 28, wherein the predicting of the expected repair, maintenance, or replacement of the physical system occurs when the health level of the physical system reaches 5%.

30. The system according to claim 28, wherein the sixth processor predicts an expected repair, maintenance, or replacement of the physical system without destructive analysis of the physical system.

* * * * *